(12) United States Patent
Yuan et al.

(10) Patent No.: US 12,256,442 B2
(45) Date of Patent: Mar. 18, 2025

(54) TECHNIQUES FOR REQUESTING UPLINK TRANSMISSION RESOURCES FOR MAXIMUM PERMISSIBLE EXPOSURE REPORTING

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 17/758,256

(22) PCT Filed: Feb. 11, 2020

(86) PCT No.: PCT/CN2020/074699
§ 371 (c)(1),
(2) Date: Jun. 30, 2022

(87) PCT Pub. No.: WO2021/159268
PCT Pub. Date: Aug. 19, 2021

(65) Prior Publication Data
US 2023/0019087 A1 Jan. 19, 2023

(51) Int. Cl.
*H04W 74/0833* (2024.01)
*H04W 24/08* (2009.01)
(Continued)

(52) U.S. Cl.
CPC ....... *H04W 74/0841* (2013.01); *H04W 24/08* (2013.01); *H04W 72/1263* (2013.01); *H04W 72/23* (2023.01)

(58) Field of Classification Search
None
See application file for complete search history.

(56) References Cited

U.S. PATENT DOCUMENTS

| 2012/0093106 A1* | 4/2012 | Dong | H04W 48/18 |
| | | | 370/329 |
| 2018/0278318 A1 | 9/2018 | Chakraborty et al. | |

(Continued)

FOREIGN PATENT DOCUMENTS

CN 110536397 A 12/2019

OTHER PUBLICATIONS

International Search Report and Written Opinion—PCT/CN2020/074699—ISA/EPO—Oct. 27, 2020.

(Continued)

*Primary Examiner* — Andre Tacdiran
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may identify a maximum permissible exposure (MPE) event associated with a beam, determine that a physical uplink control channel (PUCCH) resource for transmitting a scheduling request is unavailable based at least in part on the identification of the MPE event associated with the beam, and initiate, based at least in part on the determination that the PUCCH resource is unavailable, a physical random access channel (PRACH) procedure to transmit an uplink message. Numerous other aspects are provided.

32 Claims, 12 Drawing Sheets

(51) Int. Cl.
     *H04W 72/1263*     (2023.01)
     *H04W 72/23*       (2023.01)

(56) References Cited

U.S. PATENT DOCUMENTS

| | | | | |
|---|---|---|---|---|
| 2019/0029049 | A1 | 1/2019 | Akkarakaran et al. | |
| 2019/0053271 | A1 | 2/2019 | Islam et al. | |
| 2019/0313264 | A1* | 10/2019 | Lin | H04W 72/046 |
| 2020/0107331 | A1* | 4/2020 | Tsai | H04B 7/088 |
| 2021/0022052 | A1* | 1/2021 | Lee | H04W 76/19 |
| 2021/0211181 | A1* | 7/2021 | Yang | H04W 76/19 |
| 2022/0294508 | A1* | 9/2022 | Chen | H04B 17/318 |
| 2022/0322411 | A1* | 10/2022 | Matsumura | H04W 72/23 |
| 2023/0054184 | A1* | 2/2023 | Loehr | H04W 74/0808 |
| 2023/0058930 | A1* | 2/2023 | Matsumura | H04B 1/3838 |
| 2023/0083588 | A1* | 3/2023 | Matsumura | H04W 52/146 |
| | | | | 455/522 |

OTHER PUBLICATIONS

Qualcomm Incorporated: "Enhancements on Multi-Beam Operation", 3GPP Draft, 3GPP TSG-RAN WG1 Meeting #97, R1-1907290 Enhancements on Multi-beam Operation, 3rd Generation Partnership Project (3GPP), Mobile Competence Centre, 650, Route Des Lucioles, F-06921 Sophia-Anti Polis Cedex, France, vol. RAN WG1, No. Reno, USA, May 13, 2019-May 17, 2019, May 13, 2019 (May 13, 2019), XP051728730, XP051709313, pp. 1-26, Retrieved from the Internet: URL: http://www.3gpp.org/ftp/Meetings%5F3GPP%5FSYNC/RAN1/Docs/R1%2D1907290%2Ezip, http://www.3gpp.org/ftp/Meetings%5F3GPP%5FSYNC/RAN1/Docs/R1%2D1907290%2Ezip, [retrieved on May 13, 2019], Sections 2-8, Sections 1, 6, 8.2 and 8.4, p. 11, paragraph 1-paragraph 2.

Supplementary European Search Report—EP20918927—Search Authority—The Hague—Oct. 16, 2023.

\* cited by examiner

TECHNIQUES FOR REQUESTING UPLINK TRANSMISSION RESOURCES FOR MAXIMUM PERMISSIBLE EXPOSURE REPORTING

CROSS-REFERENCE TO RELATED APPLICATION

This application is a 371 national stage of Patent Cooperation Treaty (PCT) Application No. PCT/CN2020/074699 filed on Feb. 11, 2020, entitled "TECHNIQUES FOR REQUESTING UPLINK TRANSMISSION RESOURCES FOR MAXIMUM PERMISSIBLE EXPOSURE REPORTING," which is hereby expressly incorporated by reference herein.

FIELD OF THE DISCLOSURE

Aspects of the present disclosure generally relate to wireless communication and to techniques and apparatuses for techniques for requesting uplink transmission resources for maximum permissible exposure reporting.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include identifying a maximum permissible exposure (MPE) event associated with a beam, determining that a physical uplink control channel (PUCCH) resource for transmitting a scheduling request is unavailable based at least in part on the identification of the MPE event associated with the beam, and initiating, based at least in part on the determination that the PUCCH resource is unavailable, a physical random access channel (PRACH) procedure to transmit an uplink message.

In some aspects, the uplink message comprises one or more of a report of the MPE event, a beam failure report, or a physical uplink shared channel transmission.

In some aspects, the initiation of the PRACH procedure is based at least in part on a determination that an additional PUCCH resource for transmitting the scheduling request is unavailable.

In some aspects, the method includes determining that the additional PUCCH resource for transmitting the scheduling request is unavailable based at least in part on the MPE event or an additional MPE event being associated with an additional beam associated with the additional PUCCH resource, and the initiation of the PRACH procedure is based at least in part on the determination that the additional PUCCH resource is unavailable.

In some aspects, the PRACH procedure comprises one of a contention based PRACH, a contention free PRACH, or a two-step PRACH.

In some aspects, the method includes selecting a PRACH type from one or more candidate PRACH types, and the one or more candidate PRACH types include one or more of a contention based PRACH type, a contention free PRACH type, or a two-step PRACH type.

In some aspects, selection of the PRACH type includes selecting a contention free PRACH type if a contention free PRACH type is available, selecting a two-step PRACH type if a contention free PRACH type is unavailable and a two-step PRACH type is available, and selecting a contention based PRACH type if a contention free PRACH type is unavailable, a two-step PRACH type is unavailable, and a contention based PRACH type is available.

In some aspects, initiation of the PRACH procedure includes transmitting a Message 1 of a contention based PRACH procedure or a contention free-PRACH procedure.

In some aspects, the method includes receiving an uplink grant to transmit the uplink message.

In some aspects, the uplink grant is an MPE dedicated uplink grant.

In some aspects, the reception of the uplink grant includes receiving the uplink grant via the beam of the PUCCH resource that is associated with the MPE event.

In some aspects, the uplink grant indicates a new beam to use to transmit the uplink message.

In some aspects, the method includes transmitting the uplink message.

In some aspects, transmission of the uplink message includes transmitting the uplink message via a new beam.

In some aspects, a method of wireless communication, performed by a UE, may include identifying an MPE event associated with a beam, determining that a physical uplink shared channel (PUSCH) resource for transmitting an uplink message is unavailable based at least in part on the identification of the MPE event associated with the beam, and initiating a reporting procedure, the initiation of the reporting procedure comprising initiating, based at least in part on the determination that the PUSCH resource is unavailable, a PRACH procedure to transmit an uplink message, or transmitting a scheduling request via an MPE-dedicated PUCCH resource to transmit the uplink message.

In some aspects, the method includes determining to not transmit a scheduling request via a PUCCH resource associated with the PUSCH resource based at least in part on the identification of the MPE event.

In some aspects, the method includes determining to not transmit a scheduling request via a PUCCH resource associated with beam failure recovery based at least in part on the identification of the MPE event.

In some aspects, the uplink message includes one or more of a report of the MPE event, a beam failure report, or a PUSCH transmission.

In some aspects, the method includes transmitting the uplink message.

In some aspects, transmission of the uplink message includes transmitting the uplink message via a new beam.

In some aspects, the new beam is a same beam used to initiate the PRACH procedure or to transmit a scheduling request for the uplink message.

In some aspects, the transmission of the scheduling request via the MPE-dedicated PUCCH resource includes transmitting a scheduling request via the MPE-dedicated PUCCH resource via an additional beam that is different from the beam of the PUSCH resource.

In some aspects, the method includes receiving an uplink grant to transmit the uplink message.

In some aspects, the uplink grant is an MPE dedicated uplink grant.

In some aspects, the reception of the uplink grant includes receiving the uplink grant via the beam of the PUCCH resource that is associated with the MPE event.

In some aspects, the uplink grant indicates a new beam to use to transmit the uplink message.

In some aspects, a UE for wireless communication may include memory and one or more processors coupled to the memory. The memory and the one or more processors may be configured to identify an MPE event associated with a beam, determine that a PUCCH resource for transmitting a scheduling request is unavailable based at least in part on the identification of the MPE event associated with the beam, and initiate, based at least in part on the determination that the PUCCH resource is unavailable, a PRACH procedure to transmit an uplink message.

In some aspects, the uplink message comprises one or more of a report of the MPE event, a beam failure report, or a physical uplink shared channel transmission.

In some aspects, the initiation of the PRACH procedure is based at least in part on a determination that an additional PUCCH resource for transmitting the scheduling request is unavailable.

In some aspects, the one or more processors may be configured to determine that the additional PUCCH resource for transmitting the scheduling request is unavailable based at least in part on the MPE event or an additional MPE event being associated with an additional beam associated with the additional PUCCH resource, and the initiation of the PRACH procedure is based at least in part on the determination that the additional PUCCH resource is unavailable.

In some aspects, the PRACH procedure comprises one of a contention based PRACH, a contention free PRACH, or a two-step PRACH.

In some aspects, the one or more processors may be configured to select a PRACH type from one or more candidate PRACH types, and the one or more candidate PRACH types include one or more of a contention based PRACH type, a contention free PRACH type, or a two-step PRACH type.

In some aspects, selection of the PRACH type includes selecting a contention free PRACH type if a contention free PRACH type is available, selecting a two-step PRACH type if a contention free PRACH type is unavailable and a two-step PRACH type is available, and selecting a contention based PRACH type if a contention free PRACH type is unavailable, a two-step PRACH type is unavailable, and a contention based PRACH type is available.

In some aspects, initiation of the PRACH procedure includes transmitting a Message 1 of a contention based PRACH procedure or a contention free-PRACH procedure.

In some aspects, the one or more processors may be configured to receive an uplink grant to transmit the uplink message.

In some aspects, the uplink grant is an MPE dedicated uplink grant.

In some aspects, the reception of the uplink grant includes receiving the uplink grant via the beam of the PUCCH resource that is associated with the MPE event.

In some aspects, the uplink grant indicates a new beam to use to transmit the uplink message.

In some aspects, the one or more processors may be configured to transmit the uplink message.

In some aspects, transmission of the uplink message includes transmitting the uplink message via a new beam.

In some aspects, a UE for wireless communication may include memory and one or more processors coupled to the memory. The memory and the one or more processors may be configured to identify an MPE event associated with a beam, determine that a PUSCH resource for transmitting an uplink message is unavailable based at least in part on the identification of the MPE event associated with the beam, and initiate a reporting procedure, the initiation of the reporting procedure comprising initiate, based at least in part on the determination that the PUSCH resource is unavailable, a PRACH procedure to transmit an uplink message, or transmit a scheduling request via an MPE-dedicated PUCCH resource to transmit the uplink message.

In some aspects, the one or more processors may be configured to determine to not transmit a scheduling request via a PUCCH resource associated with the PUSCH resource based at least in part on the identification of the MPE event.

In some aspects, the one or more processors may be configured to determine to not transmit a scheduling request via a PUCCH resource associated with beam failure recovery based at least in part on the identification of the MPE event.

In some aspects, the uplink message includes one or more of a report of the MPE event, a beam failure report, or a PUSCH transmission.

In some aspects, the one or more processors may be configured to transmit the uplink message.

In some aspects, transmission of the uplink message includes transmitting the uplink message via a new beam.

In some aspects, the new beam is a same beam used to initiate the PRACH procedure or to transmit a scheduling request for the uplink message.

In some aspects, the transmission of the scheduling request via the MPE-dedicated PUCCH resource includes transmitting a scheduling request via the MPE-dedicated PUCCH resource via an additional beam that is different from the beam of the PUSCH resource.

In some aspects, the one or more processors may be configured to receive an uplink grant to transmit the uplink message.

In some aspects, the uplink grant is an MPE dedicated uplink grant.

In some aspects, the reception of the uplink grant includes receiving the uplink grant via the beam of the PUCCH resource that is associated with the MPE event.

In some aspects, the uplink grant indicates a new beam to use to transmit the uplink message.

In some aspects, a non-transitory computer-readable medium may store one or more instructions for wireless communication. The one or more instructions, when executed by one or more processors of a UE, may cause the one or more processors to identify an MPE event associated with a beam, determine that a PUCCH resource for transmitting a scheduling request is unavailable based at least in part on the identification of the MPE event associated with the beam, and initiate, based at least in part on the determination that the PUCCH resource is unavailable, a PRACH procedure to transmit an uplink message.

In some aspects, the uplink message comprises one or more of a report of the MPE event, a beam failure report, or a physical uplink shared channel transmission.

In some aspects, the initiation of the PRACH procedure is based at least in part on a determination that an additional PUCCH resource for transmitting the scheduling request is unavailable.

In some aspects, the one or more instructions, when executed by one or more processors of a UE, may cause the one or more processors to determine that the additional PUCCH resource for transmitting the scheduling request is unavailable based at least in part on the MPE event or an additional MPE event being associated with an additional beam associated with the additional PUCCH resource, and the initiation of the PRACH procedure is based at least in part on the determination that the additional PUCCH resource is unavailable.

In some aspects, the PRACH procedure comprises one of a contention based PRACH, a contention free PRACH, or a two-step PRACH.

In some aspects, the one or more instructions, when executed by one or more processors of a UE, may cause the one or more processors to select a PRACH type from one or more candidate PRACH types, and the one or more candidate PRACH types include one or more of a contention based PRACH type, a contention free PRACH type, or a two-step PRACH type.

In some aspects, selection of the PRACH type includes selecting a contention free PRACH type if a contention free PRACH type is available, selecting a two-step PRACH type if a contention free PRACH type is unavailable and a two-step PRACH type is available, and selecting a contention based PRACH type if a contention free PRACH type is unavailable, a two-step PRACH type is unavailable, and a contention based PRACH type is available.

In some aspects, initiation of the PRACH procedure includes transmitting a Message 1 of a contention based PRACH procedure or a contention free-PRACH procedure.

In some aspects, the one or more instructions, when executed by one or more processors of a UE, may cause the one or more processors to receive an uplink grant to transmit the uplink message.

In some aspects, the uplink grant is an MPE dedicated uplink grant.

In some aspects, the reception of the uplink grant includes receiving the uplink grant via the beam of the PUCCH resource that is associated with the MPE event.

In some aspects, the uplink grant indicates a new beam to use to transmit the uplink message.

In some aspects, the one or more instructions, when executed by one or more processors of a UE, may cause the one or more processors to transmit the uplink message.

In some aspects, transmission of the uplink message includes transmitting the uplink message via a new beam.

In some aspects, a non-transitory computer-readable medium may store one or more instructions for wireless communication. The one or more instructions, when executed by one or more processors of a UE, may cause the one or more processors to identify an MPE event associated with a beam, determine that a PUSCH resource for transmitting an uplink message is unavailable based at least in part on the identification of the MPE event associated with the beam, and initiate a reporting procedure, the initiation of the reporting procedure comprising initiate, based at least in part on the determination that the PUSCH resource is unavailable, a PRACH procedure to transmit an uplink message, or transmit a scheduling request via an MPE-dedicated PUCCH resource to transmit the uplink message.

In some aspects, the one or more instructions, when executed by one or more processors of a UE, may cause the one or more processors to determine to not transmit a scheduling request via a PUCCH resource associated with the PUSCH resource based at least in part on the identification of the MPE event.

In some aspects, the one or more instructions, when executed by one or more processors of a UE, may cause the one or more processors to determine to not transmit a scheduling request via a PUCCH resource associated with beam failure recovery based at least in part on the identification of the MPE event.

In some aspects, the uplink message includes one or more of a report of the MPE event, a beam failure report, or a PUSCH transmission.

In some aspects, the one or more instructions, when executed by one or more processors of a UE, may cause the one or more processors to transmit the uplink message.

In some aspects, transmission of the uplink message includes transmitting the uplink message via a new beam.

In some aspects, the new beam is a same beam used to initiate the PRACH procedure or to transmit a scheduling request for the uplink message.

In some aspects, the transmission of the scheduling request via the MPE-dedicated PUCCH resource includes transmitting a scheduling request via the MPE-dedicated PUCCH resource via an additional beam that is different from the beam of the PUSCH resource.

In some aspects, the one or more instructions, when executed by one or more processors of a UE, may cause the one or more processors to receive an uplink grant to transmit the uplink message.

In some aspects, the uplink grant is an MPE dedicated uplink grant.

In some aspects, the reception of the uplink grant includes receiving the uplink grant via the beam of the PUCCH resource that is associated with the MPE event.

In some aspects, the uplink grant indicates a new beam to use to transmit the uplink message.

In some aspects, an apparatus for wireless communication may include means for identifying an MPE event associated with a beam, means for determining that a PUCCH resource for transmitting a scheduling request is unavailable based at least in part on the identification of the MPE event associated with the beam, and means for initiating, based at least in part on the determination that the PUCCH resource is unavailable, a PRACH procedure to transmit an uplink message.

In some aspects, the uplink message comprises one or more of a report of the MPE event, a beam failure report, or a physical uplink shared channel transmission.

In some aspects, the initiation of the PRACH procedure is based at least in part on a determination that an additional PUCCH resource for transmitting the scheduling request is unavailable.

In some aspects, the apparatus may include means for determining that the additional PUCCH resource for transmitting the scheduling request is unavailable based at least in part on the MPE event or an additional MPE event being associated with an additional beam associated with the additional PUCCH resource, and the initiation of the PRACH procedure is based at least in part on the determination that the additional PUCCH resource is unavailable.

In some aspects, the PRACH procedure comprises one of a contention based PRACH, a contention free PRACH, or a two-step PRACH.

In some aspects, the apparatus may include means for selecting a PRACH type from one or more candidate PRACH types, and the one or more candidate PRACH types include one or more of a contention based PRACH type, a contention free PRACH type, or a two-step PRACH type.

In some aspects, selection of the PRACH type includes selecting a contention free PRACH type if a contention free PRACH type is available, selecting a two-step PRACH type if a contention free PRACH type is unavailable and a two-step PRACH type is available, and selecting a contention based PRACH type if a contention free PRACH type is unavailable, a two-step PRACH type is unavailable, and a contention based PRACH type is available.

In some aspects, initiation of the PRACH procedure includes transmitting a Message 1 of a contention based PRACH procedure or a contention free-PRACH procedure.

In some aspects, the apparatus may include means for receiving an uplink grant to transmit the uplink message.

In some aspects, the uplink grant is an MPE dedicated uplink grant.

In some aspects, the reception of the uplink grant includes receiving the uplink grant via the beam of the PUCCH resource that is associated with the MPE event.

In some aspects, the uplink grant indicates a new beam to use to transmit the uplink message.

In some aspects, the apparatus may include means for transmitting the uplink message.

In some aspects, transmission of the uplink message includes transmitting the uplink message via a new beam.

In some aspects, an apparatus for wireless communication may include means for identifying an MPE event associated with a beam, means for determining that a PUSCH resource for transmitting an uplink message is unavailable based at least in part the identification of the MPE event associated with the beam, and means for initiating a reporting procedure, the initiation of the reporting procedure comprising means for initiating, based at least in part on the determination that the PUSCH resource is unavailable, a PRACH procedure to transmit an uplink message, or means for transmitting a scheduling request via an MPE-dedicated PUCCH resource to transmit the uplink message.

In some aspects, the apparatus may include means for determining to not transmit a scheduling request via a PUCCH resource associated with the PUSCH resource based at least in part on the identification of the MPE event.

In some aspects, the apparatus may include means for determining to not transmit a scheduling request via a PUCCH resource associated with beam failure recovery based at least in part on the identification of the MPE event.

In some aspects, the uplink message includes one or more of a report of the MPE event, a beam failure report, or a PUSCH transmission.

In some aspects, the apparatus may include means for transmitting the uplink message.

In some aspects, transmission of the uplink message includes transmitting the uplink message via a new beam.

In some aspects, the new beam is a same beam used to initiate the PRACH procedure or to transmit a scheduling request for the uplink message.

In some aspects, the transmission of the scheduling request via the MPE-dedicated PUCCH resource includes transmitting a scheduling request via the MPE-dedicated PUCCH resource via an additional beam that is different from the beam of the PUSCH resource.

In some aspects, the apparatus may include means for receiving an uplink grant to transmit the uplink message.

In some aspects, the uplink grant is an MPE dedicated uplink grant.

In some aspects, the reception of the uplink grant includes receiving the uplink grant via the beam of the PUCCH resource that is associated with the MPE event.

In some aspects, the uplink grant indicates a new beam to use to transmit the uplink message.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
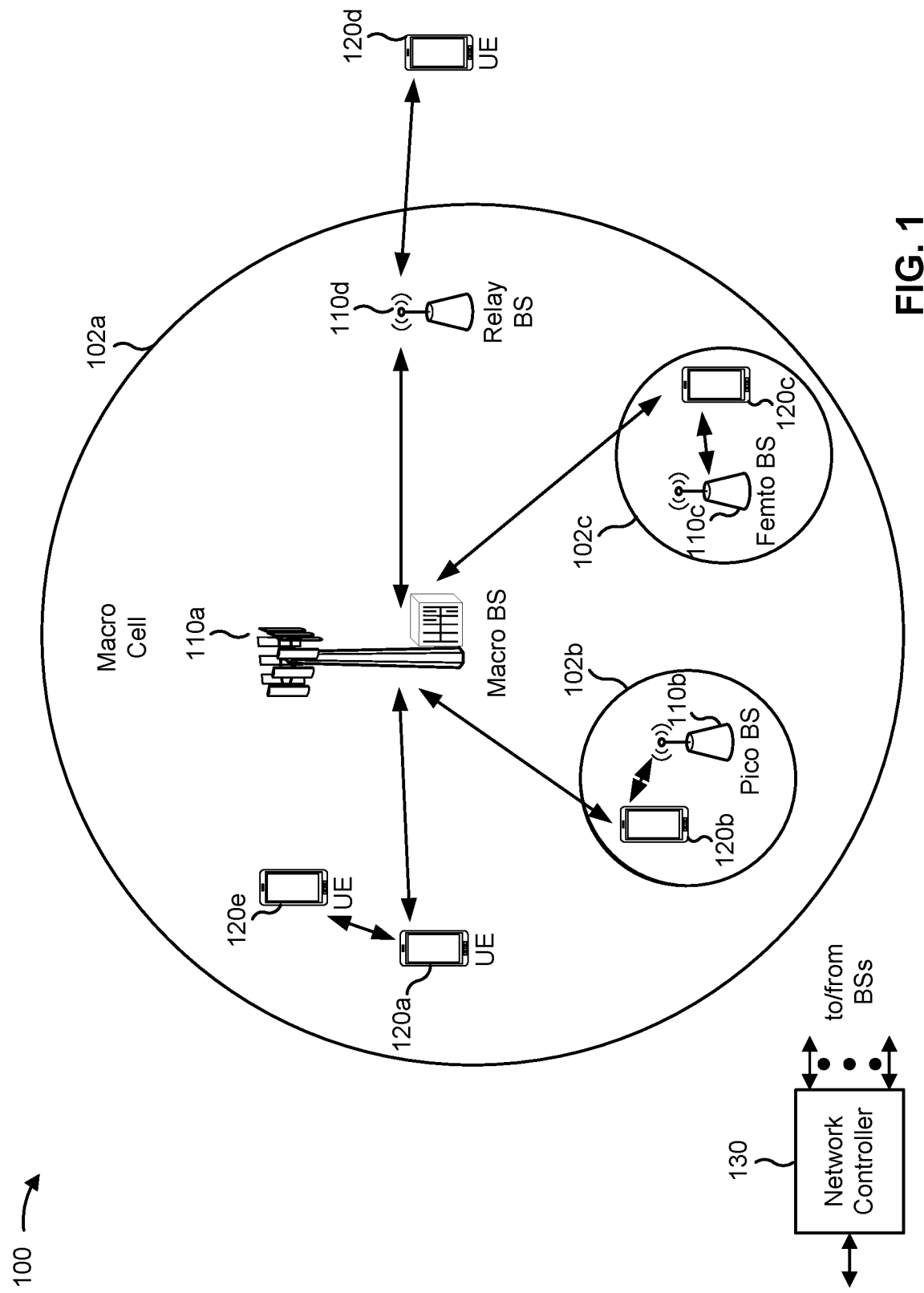
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
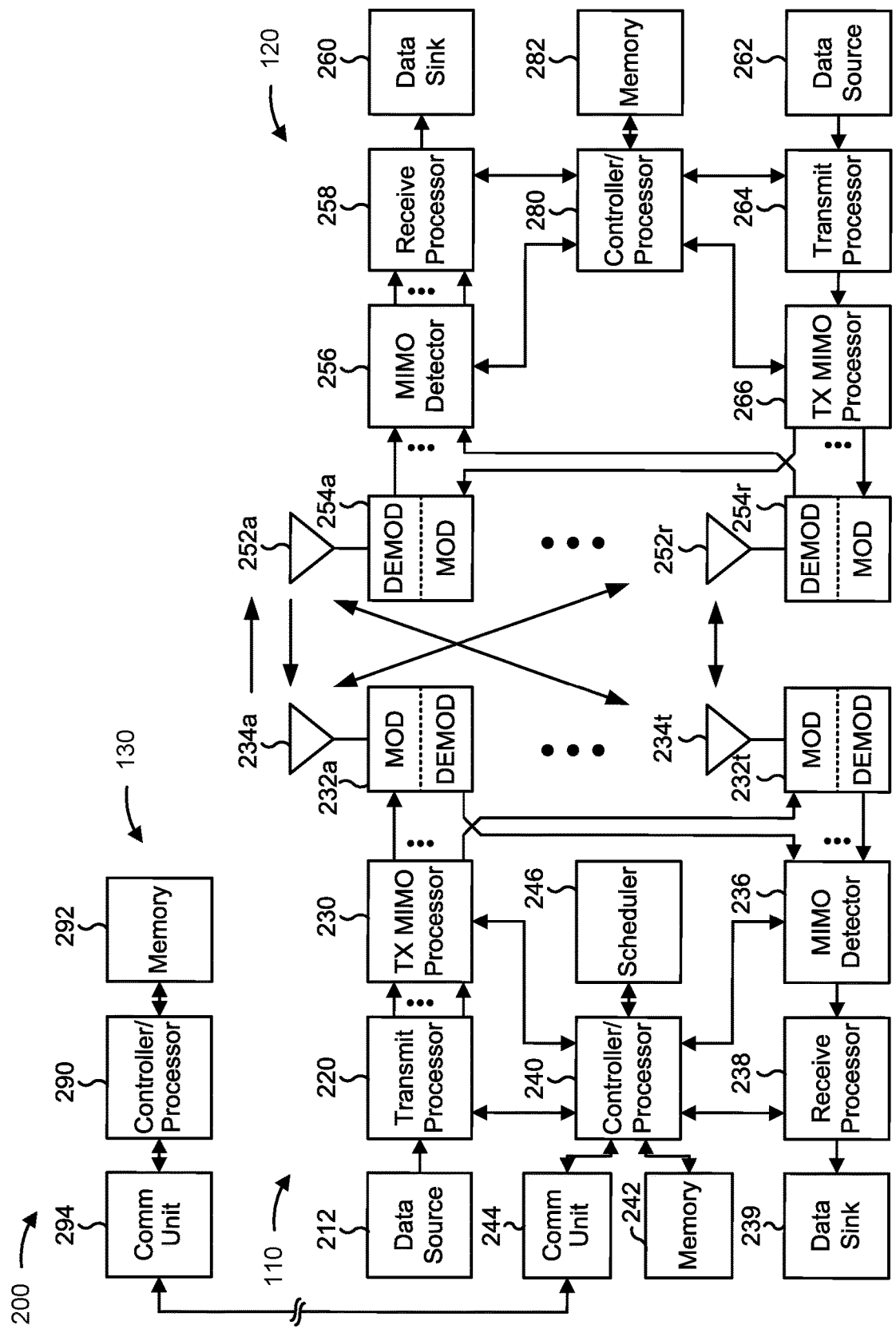
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more operations associated with techniques for requesting uplink transmission resources for maximum permissible exposure (MPE) reporting, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 900 of FIG. 9, process 1000 of FIG. 10, process 1100 of FIG. 11, and/or other processes as described herein. A scheduler 246 may schedule UEs for data transmission on the downlink and/or uplink.

In some aspects, UE 120 may include means for identifying an MPE event associated with a beam; means for determining that a PUCCH resource for transmitting a scheduling request is unavailable based at least in part on the identification of the MPE event associated with the beam; means for initiating, based at least in part on the determination that the PUCCH resource is unavailable, a PRACH procedure to transmit an uplink message; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for identifying an MPE event associated with a beam; means for determining that a PUSCH resource for transmitting an uplink message is unavailable based at least in part on the identification of the MPE event associated with the beam; means for initiating a reporting procedure, the initiation of the reporting procedure comprising initiating, based at least in part on the determination that the PUSCH resource is unavailable, a PRACH procedure to transmit an uplink message, or transmitting a scheduling request via an MPE-dedicated PUCCH resource to transmit the uplink message; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
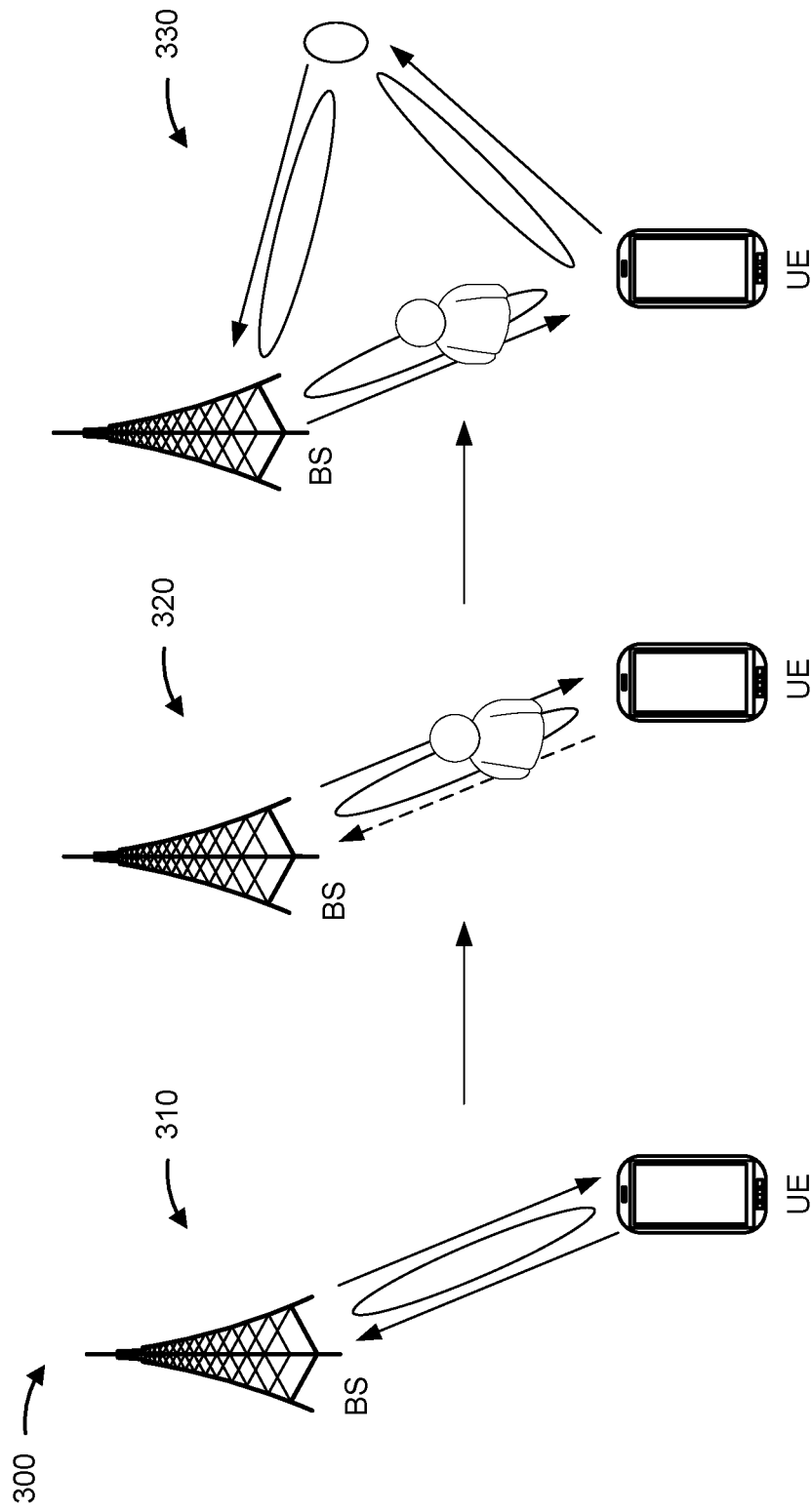
FIG. 3 is a diagram illustrating an example of identifying an MPE event associated with a beam, in accordance with various aspects of the present disclosure.

FIG. 3 is a diagram illustrating an example 300 of identifying an MPE event associated with a beam, in accordance with various aspects of the present disclosure.

As shown in FIG. 3, and by reference number 310, a UE and a base station may communicate using directional beams. In some wireless networks, a UE may communicate with a base station using directional beamforming to boost transmission power in one or more particular directions associated with one or more beams. By concentrating transmission power in one or more beams, an output energy associated with transmissions using the one or beams may be higher than if the UE performed an omni-directional transmission for the transmissions. This may increase a range of the transmissions, but may also cause an energy density of the transmission to satisfy (e.g., exceed) an MPE value that defines a highest energy density that is allowed to be exposed to a human body at close range. An MPE value may be defined via radio resource control (RRC) configurations, for example, to comply with a standard and/or a regulation. The standard and/or regulation may have different limits for different frequency bandwidths. For example, a limit (e.g., corresponding to the MPE value) may be lower for millimeter wave (mmWave) transmissions than for sub-6 wave transmissions.

As shown by reference number 320, the UE may identify an MPE event. The UE may identify the MPE event based at least in part on detecting a part of a human body and/or other organic material at close range for the UE within a path of an uplink beam. Based at least in part on detecting a part of a human body in a direction of a beam for which transmissions would use an energy density that satisfies the MPE, the UE may reduce transmission power of one or more antennas that are associated with the beam. However, by reducing transmission power of the one or more antennas that are associated with the beam, the transmission may have insufficient power for the base station to receive the transmission. This may cause a beam failure.

As shown by reference number 330, the UE may resume communicating with the base station using a new beam for uplink communications. The new beam may be in a different direction from the beam associated with the MPE event. The MPE event may be referenced as uplink beam failure in some of the discussion below.

As indicated above, FIG. 3 is provided as an example. Other examples may differ from what is described with regard to FIG. 3.

Figure 4:
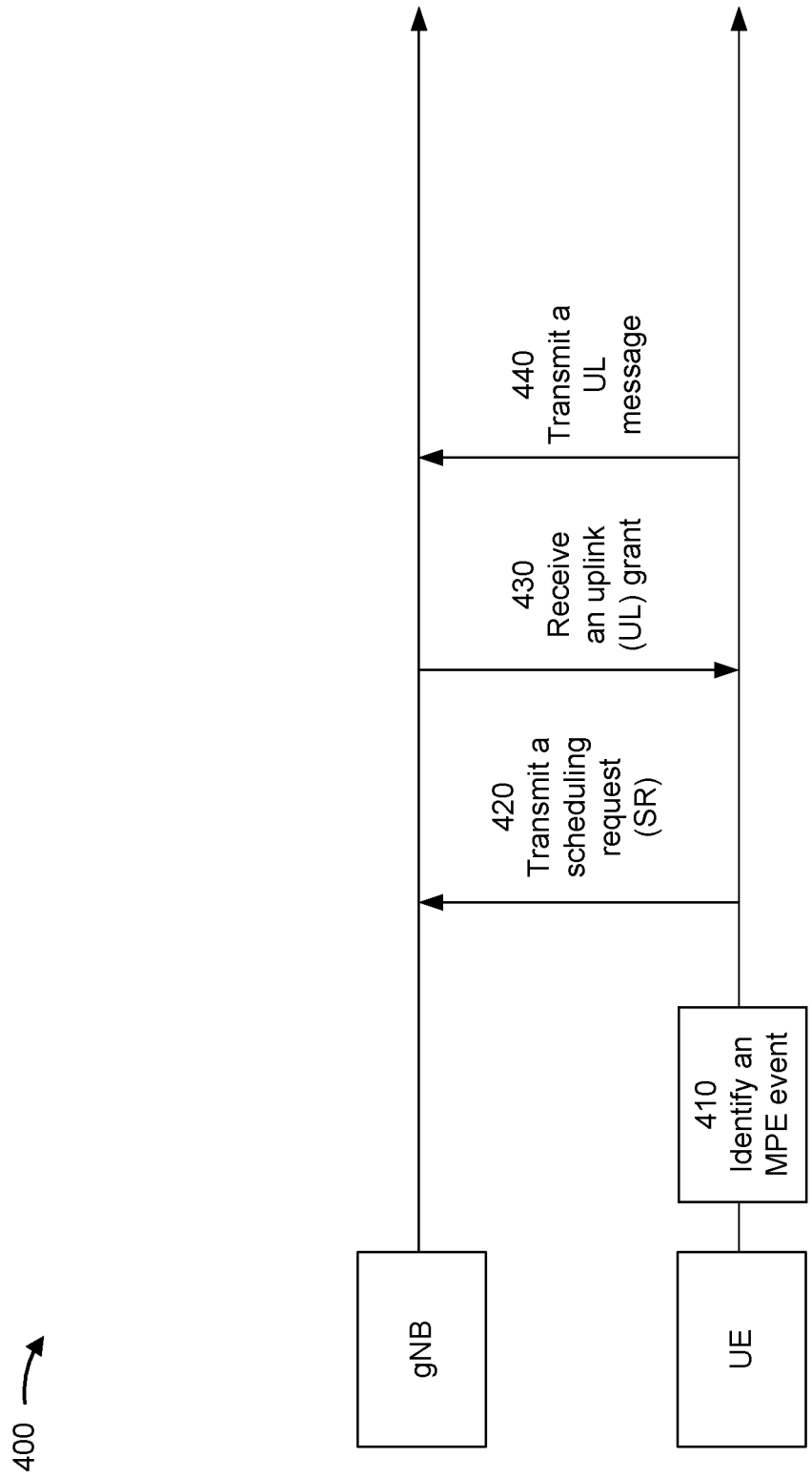
FIG. 4 is a diagram illustrating an example of identifying an MPE event associated with a beam, in accordance with various aspects of the present disclosure.

FIG. 4 is a diagram illustrating an example 400 of identifying an MPE event associated with a beam, in accordance with various aspects of the present disclosure.

As shown in FIG. 4, and by reference number 410, a UE may identify an MPE event. The UE may identify the MPE event based at least in part on the UE detecting a part of a human body or other organic matter at close range for the UE within a path of a current beam resource (e.g., a PUSCH). The UE may identify the MPE event further based at least in part on determining that reducing a transmission power of one or more antennas to comply with an MPE metric may result in the transmission, using the current beam resource, not having sufficient power for the base station to receive the transmission.

As shown by reference number 420, the UE may transmit a scheduling request (SR) to the base station. The UE may transmit the SR to the base station using an uplink resource (e.g., a PUCCH). The transmit beam associated with the PUCCH resource may be preconfigured by higher layer signaling such as RRC or medium access control control element (MAC-CE) signaling. The uplink resource may be associated with a beam that is different from a current beam associated with the MPE event. However, if the beam associated with the uplink resource is also affected by the MPE event, the uplink resource may be unavailable.

As shown by reference number 430, the UE may receive an uplink grant from the base station. The UE may receive the uplink grant based at least in part on the base station receiving the SR. In other words, the UE may receive the uplink grant if the uplink resource is not associated with a beam that is associated with the MPE event. The uplink grant may identify the uplink resource for the UE to use to transmit the uplink message.

As shown by reference number 440, the UE may transmit an uplink message via an uplink resource. For example, the UE may transmit a report of the MPE event, a report for an uplink beam failure event, a report for a beam failure recovery event, and/or the like.

As indicated above, FIG. 4 is provided as an example. Other examples may differ from what is described with regard to FIG. 4.

A UE may attempt to transmit an SR via an uplink resource, even if the uplink resource is associated with a beam that is associated with an MPE event. Attempting to transmit the SR via the uplink resource, regardless of whether the uplink resource is associated with the MPE event, may consume computing, communication, and/or network resources for the base station and the UE to determine that the power for transmitting the SR using the uplink resource is not sufficient for the base station to receive the transmissions and to recover unreceived transmissions. Further, a delay that is based at least in part on waiting to attempt to transmit the SR via the uplink resource before attempting another procedure to request a resource may cause a synchronization error for the UE and the base station.

In some aspects described herein, a UE (e.g., UE 120) may identify an MPE event associated with a beam and determine whether an uplink resource (e.g., a PUCCH resource) for transmitting a scheduling request is available. In some aspects the UE may determine whether the uplink resource is available based at least in part on the identification of the MPE event associated with the beam. Based at least in part on determining that the uplink resource is unavailable, the UE may determine whether another uplink resource associated with an SR is available. In some aspects, the UE may skip one or more SR occasions of one or more uplink resources (e.g., one or more uplink resources that are associated with one or more beams that are associated with the MPE event). Based at least in part on skipping the one or more occasions to transmit an SR, the UE may instead initiate a PRACH procedure to request an uplink grant. The transmit beam associated with the PRACH procedure may not be preconfigured, and may be determined by the UE. For example, the UE may initiate a PRACH procedure to request an uplink grant to transmit a MAC-CE based report for the MPE event and/or a beam failure recovery event. In this way, the UE may conserve computing, communication, and/or network resources that may otherwise have been used to first attempt to transmit an SR using an uplink resource that is associated with a beam that is associated with the MPE event.

Figure 5:
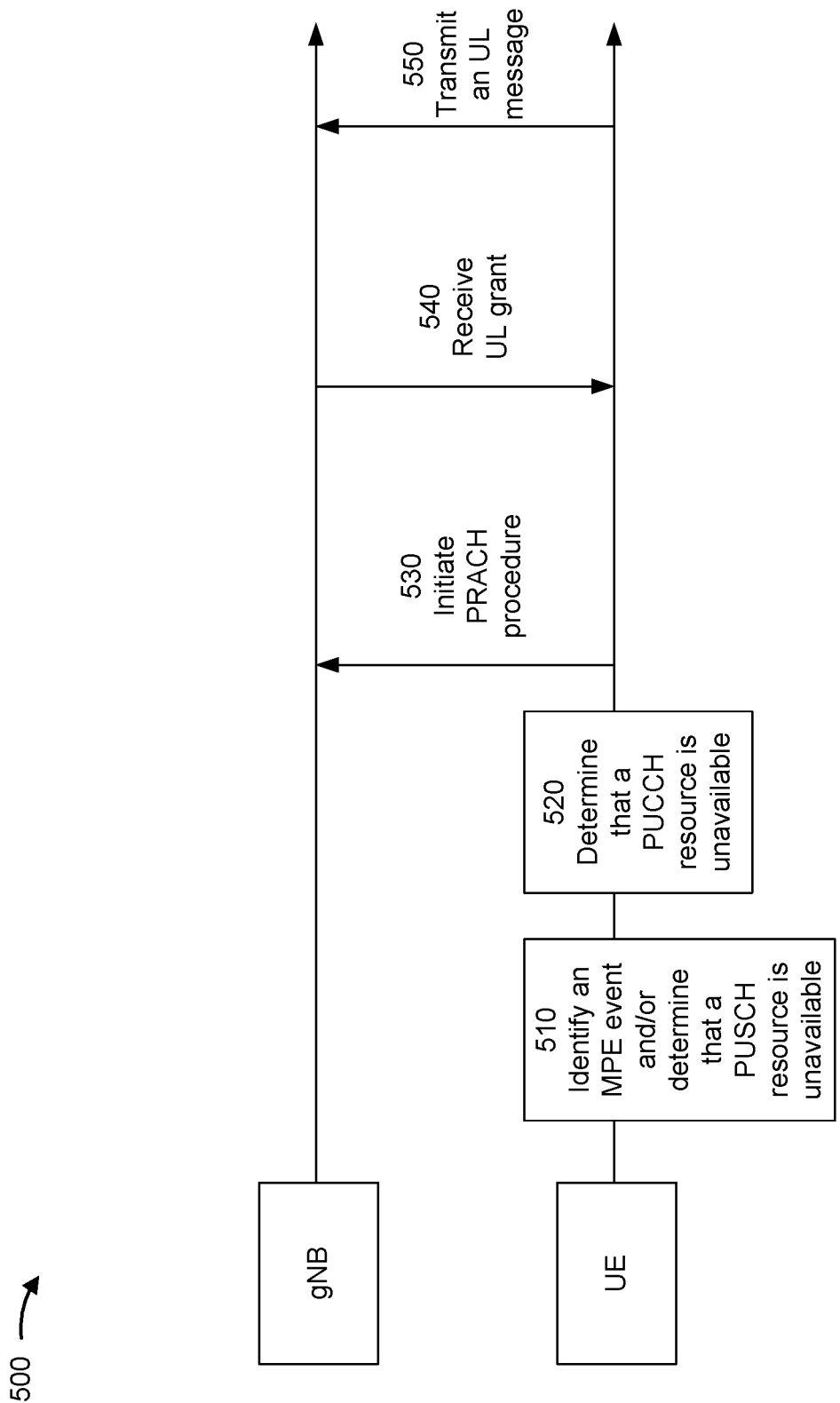
FIG. 5 is a diagram illustrating an example of identifying an MPE event associated with a beam, in accordance with various aspects of the present disclosure.

FIG. 5 is a diagram illustrating an example 500 of identifying an MPE event associated with a beam, in accordance with various aspects of the present disclosure. As shown in FIG. 5, a UE (e.g., UE 120) may communicate with a base station (e.g., base station 110) to request an uplink resource to transmit an uplink message (e.g., a report of an MPE event). The UE and the base station may be part of a wireless network (e.g., wireless network 100).

As shown by reference number 510, the UE may identify an MPE event and/or determine that a PUSCH resource is unavailable. In some aspects, the UE may determine that the MPE event is associated with one or more beams through which the UE communicates with the base station. In some aspects, the UE may determine that one or more uplink resources (e.g., one or more PUSCH resources) are unavailable based at least in part on the MPE event. For example, beam failure for one or more beams through which the UE communicates with the base station may be based at least in part on the MPE event. In some aspects, one or more resources may be unavailable based at least in part on being associated with the one or more beams determined to be in beam failure.

As shown by reference number 520, the UE may determine that a PUCCH resource is unavailable. In some aspects, the UE may determine that the PUCCH resource is associated with requesting a resource to transmit an uplink message (e.g., a report of the MPE event, beam failure recovery event, and/or the like) associated with the PUSCH. In some aspects, the UE may determine that one or more additional PUCCH resources for transmitting the scheduling request are unavailable (e.g., based at least in part on the MPE event). In some aspects, the UE may determine that no PUCCH resources, and/or other uplink resources, are available for transmitting an SR request for a resource to transmit an uplink message.

In some aspects, the UE may determine to not transmit (e.g., skip) an SR via a PUCCH resource associated with the PUSCH based at least in part on the identification of the MPE event. In some aspects, the UE may determine to not transmit an SR via a PUCCH resource associated with beam failure recovery based at least in part on the identification of the MPE event. In other words, the UE may determine to not transmit an SR via a PUCCH resource that is unavailable based at least in part on the identification of the MPE event.

As shown by reference number 530, the UE may initiate a PRACH procedure. In some aspects, the UE may determine to initiate the PRACH procedure based at least in part on a determination that the PUCCH resource for transmitting the SR is unavailable. In some aspects, the UE may determine to initiate the PRACH procedure based at least in part on a determination that one or more additional PUCCH resources are unavailable. In some aspects, the UE may ignore one or more SR occasions of one or more PUCCH resources (e.g., one or more SR-PUCCHs) and trigger a PRACH process without waiting to determine whether the SR is received by the base station.

In some aspects, the PRACH procedure may include a contention based PRACH, a contention free PRACH, or a two-step PRACH. In some aspects, the UE may select a PRACH type for the PRACH procedure. For example, the UE may select the PRACH type from one or more candidate PRACH types, such as a contention based PRACH, a contention free PRACH, or a two-step PRACH. In some aspects, the UE may select a contention free PRACH type if a contention free PRACH type is available. If a contention free PRACH type is not available, the UE may select a two-step PRACH type if a two-step PRACH type is available. If a contention free PRACH type is unavailable and a two-step PRACH type is unavailable the UE may select a contention based PRACH type if a contention based PRACH type is available.

In some aspects, initiating the PRACH procedure may include transmitting a Message 1 of a contention based PRACH procedure or a contention free-PRACH procedure. In some aspects, initiating the PRACH procedure may include transmitting a Message A of a 2-step PRACH procedure.

In some aspects, the UE may initiate the PRACH procedure by transmitting a Message 1 or a Message A via a new beam that is different from the beam that is associated with the PUSCH and/or the PUCCH that are associated with the MPE event. In some aspects, the UE may determine that the new beam is free from the MPE event, another MPE event, and/or a beam failure event. In other words, a transmission using the new beam may have sufficient power to be received via the base station.

As shown by reference number 540, the UE may receive an uplink grant from the base station to schedule one or more uplink resources to transmit the uplink message. In some aspects, the UE may receive the uplink grant via a current downlink resource that is associated with a current beam (e.g., a beam associated with the PUCCH and/or the MPE event). In some aspects, the UE may receive the uplink grant within a downlink control information (DCI) message. In some aspects, the uplink grant may be an MPE dedicated uplink grant.

In some aspects, the uplink grant may indicate a new beam to use to transmit the uplink message. In some aspects, the uplink grant may indicate that the UE is to use a same beam to transmit the uplink message as a beam through which the UE initiated the PRACH process.

As shown by reference number 550, the UE may transmit the uplink message. In some aspects, the uplink message may include a report of the MPE event, a beam failure report, a PUSCH transmission, and/or the like. In some aspects, the uplink message may include a MAC-CE report for the MPE event, a beam failure recovery event, and/or the like. In some aspects, the UE may transmit the uplink message via a new beam. In some aspects, the new beam may be a same beam used to initiate the PRACH procedure. In some aspects, the new beam may be a beam indicated in the uplink grant.

By skipping transmission of an SR using an uplink resource associated with a beam that is associated with an MPE event, and instead initiating a PRACH process, the UE may conserve computing, communication, and/or network resources that may otherwise be used to transmit the SR without sufficient power to be received by the base station.

As indicated above, FIG. 5 is provided as an example. Other examples may differ from what is described with regard to FIG. 5.

Figure 6:
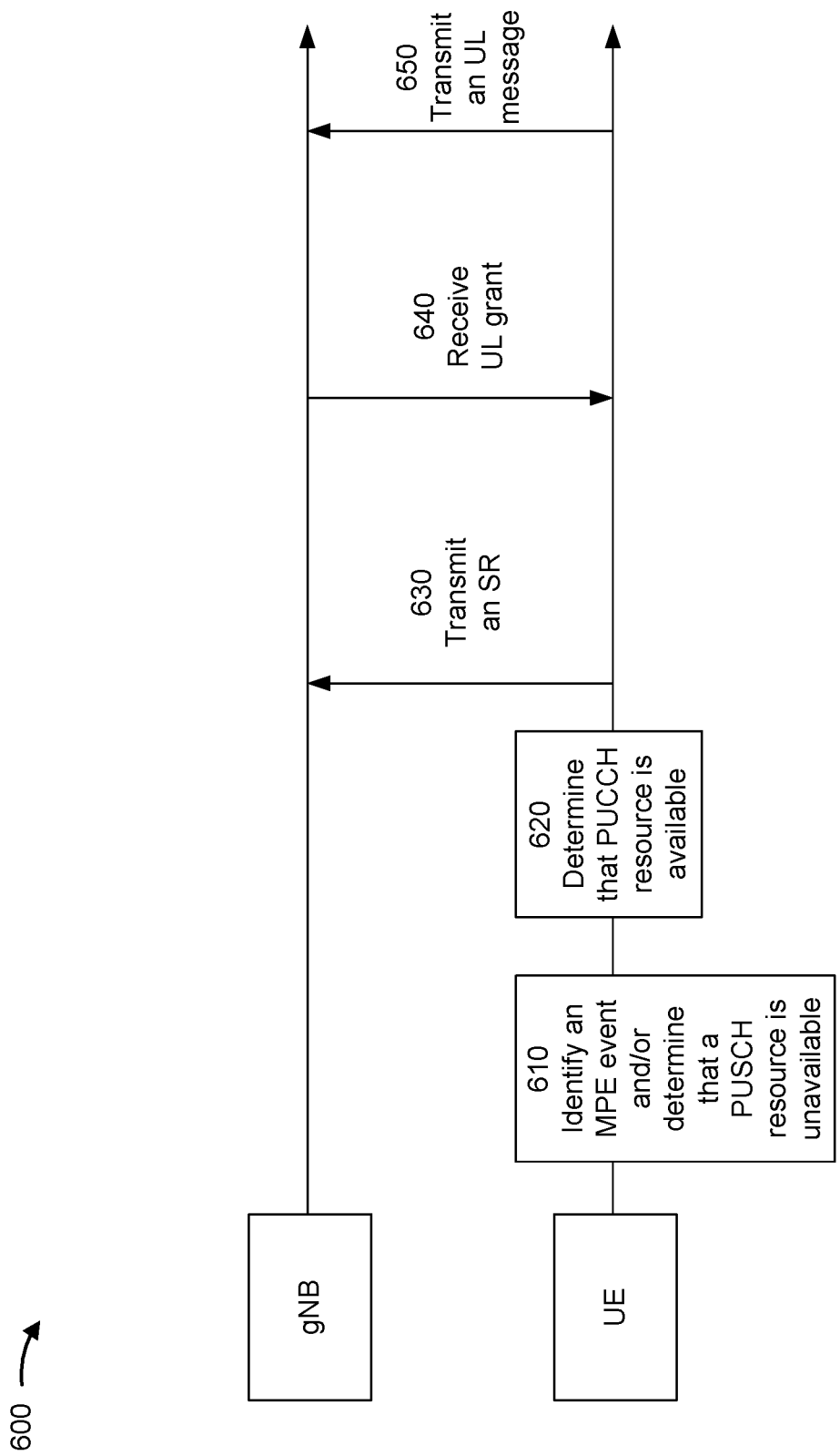
FIG. 6 is a diagram illustrating an example of identifying an MPE event associated with a beam, in accordance with various aspects of the present disclosure.

FIG. 6 is a diagram illustrating an example 600 of identifying an MPE event associated with a beam, in accordance with various aspects of the present disclosure. As shown in FIG. 6, a UE (e.g., UE 120) may communicate with a base station (e.g., base station 110) to request an uplink resource to transmit an uplink message (e.g., a report of an MPE event). The UE and the base station may be part of a wireless network (e.g., wireless network 100).

As shown in FIG. 6, and by reference number 610, the UE may identify an MPE event associated with one or more beams and/or determine that a PUSCH resource is unavailable. The PUSCH resource may be associated with at least one of the one or more beams that are associated with the MPE event.

As shown by reference number 620, the UE may determine that a PUCCH resource is available. In some aspects, the PUCCH resource may be associated with a beam that is different from the one or more beams that are associated with the MPE event. In some aspects, the UE may determine whether to transmit an SR via the PUCCH resource or to initiate a PRACH procedure based at least in part on whether one or more PUCCH resources are available (e.g., are associated with one or more beams that are not associated with the MPE event). In some aspects, the UE may only initiate a PRACH procedure if the UE has no PUCCH resources available to request a resource to transmit an uplink message (e.g., a MAC-CE report for the MPE event). In other words, the UE may determine whether to initiate a PRACH procedure or to transmit an SR via an uplink resource associated with a current beam.

As shown by reference number 630, the UE may transmit an SR. In some aspects, the SR does not include information that indicates a message type of the uplink message. In some aspects, the SR may not indicate that the MPE event has occurred or that one or more beams are associated with the MPE event.

As shown by reference number 640, the UE may receive an uplink grant from the base station. In some aspects, the UE may receive the uplink grant via a downlink resource (e.g., a physical downlink control channel (PDCCH)) associated with a current beam, such as a beam that is associated with the MPE event or a beam that is not associated with the MPE event.

As shown by reference number 650, the UE may transmit the uplink message. In some aspects, the UE may transmit the uplink message using a same beam used to transmit the SR for the uplink message. In some aspects, the UE may transmit the uplink message based at least in part on a beam and/or an uplink resource identified by the uplink grant.

By determining whether the UE has an uplink resource available to transmit an SR before determining to initiate a PRACH procedure, the UE may conserve computing, communication, and/or network resources that may otherwise have been used to perform the PRACH procedure.

As indicated above, FIG. 6 is provided as an example. Other examples may differ from what is described with regard to FIG. 6.

Figure 7:
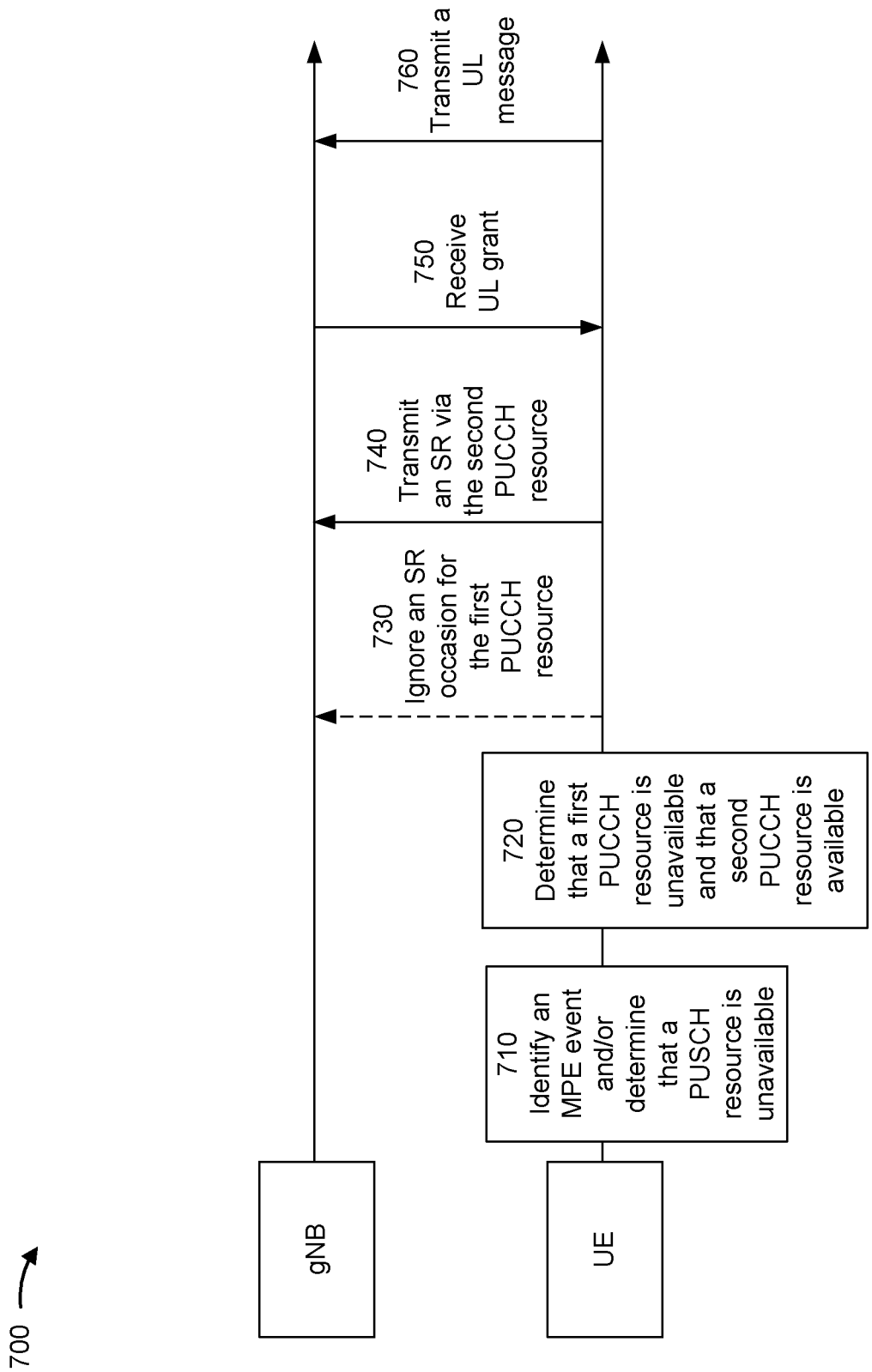
FIG. 7 is a diagram illustrating an example of identifying an MPE event associated with a beam, in accordance with various aspects of the present disclosure.

FIG. 7 is a diagram illustrating an example 700 of identifying an MPE event associated with a beam, in accordance with various aspects of the present disclosure. As shown in FIG. 7, a UE (e.g., UE 120) may communicate with a base station (e.g., base station 110) to request an uplink resource to transmit an uplink message (e.g., a report of an MPE event). The UE and the base station may be part of a wireless network (e.g., wireless network 100).

As shown in FIG. 7, and by reference number 710, the UE may identify an MPE event associated with one or more beams and/or determine that a PUSCH resource is unavailable. The PUSCH resource may be associated with at least one of the one or more beams that are associated with the MPE event.

As shown by reference number 720, the UE may determine that a first PUCCH resource is unavailable and that a second PUCCH resource is available. In some aspects, the first PUCCH resource may be associated with the PUSCH resource (e.g., the first PUCCH resource may be configured for the UE to use to transmit an SR to request a resource grant to report the MPE event). In some aspects, the first PUCCH resource may be associated with a beam that is associated with the MPE event and the second PUCCH resource may be associated with another beam that is not associated with the MPE event.

As shown by reference number 730, the UE may ignore an SR occasion for the first PUCCH. The UE may determine to ignore (e.g., skip) the SR occasion for the first PUCCH based at least in part on a determination that, based at least in part on the MPE event, a transmission power of the one or more antennas that are associated with the beam associated with the first PUCCH resource may not be sufficient for the base station to receive a transmitted SR via the first PUCCH resource. In some aspects, the first PUCCH resource may be associated with the PUSCH resource, a beam failure recovery process, and/or the like.

As shown by reference number 740, the UE may transmit an SR via the second PUCCH resource. The SR may indicate that the UE requests a resource to transmit an uplink message (e.g., a MAC-CE report for the MPE event). In some aspects, the UE may transmit the SR using a current beam configured for the second PUCCH resource.

As shown by reference number 750, the UE may receive an uplink grant from the base station. In some aspects, the uplink grant may be included in a DCI message. In some aspects, the UE may receive the uplink grant via a beam that is associated with the first PUCCH resource, a beam associated with the second PUCCH resource, or another beam.

In some aspects, the uplink grant may indicate a new beam to use to transmit the uplink message. In some aspects, the uplink grant may indicate that the UE is to use a same beam to transmit the uplink message as a beam associated with the second PUCCH.

As shown by reference number 760, the UE may transmit the uplink message. In some aspects, the UE may transmit the uplink message using a same beam used to transmit the SR for the uplink message (e.g., the beam associated with the second PUCCH). In some aspects, the UE may transmit the uplink message based at least in part on a beam and/or an uplink resource identified by the uplink grant.

By determining whether a different uplink resource (e.g., an uplink resource that is not associated with the PUSCH resource) is available to transmit an SR before determining to initiate a PRACH procedure, the UE may conserve computing, communication, and/or network resources that may otherwise have been used to perform the PRACH procedure.

As indicated above, FIG. 7 is provided as an example. Other examples may differ from what is described with regard to FIG. 7.

Figure 8:
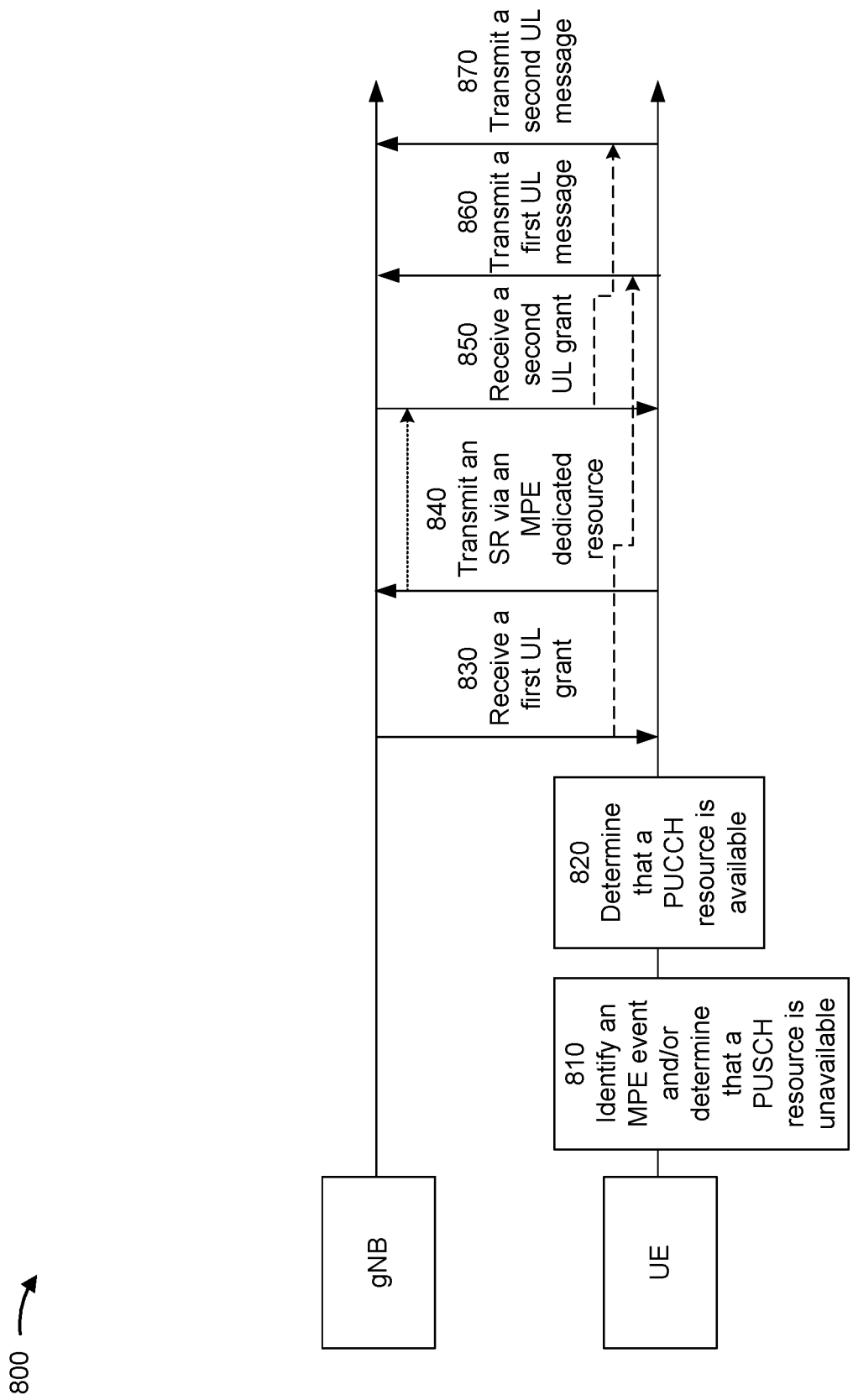
FIG. 8 is a diagram illustrating an example of identifying an MPE event associated with a beam, in accordance with various aspects of the present disclosure.

FIG. 8 is a diagram illustrating an example 800 of identifying an MPE event associated with a beam, in accordance with various aspects of the present disclosure. As shown in FIG. 8, a UE (e.g., UE 120) may communicate with a base station (e.g., base station 110) to request an uplink resource to transmit an uplink message (e.g., a report of an MPE event). The UE and the base station may be part of a wireless network (e.g., wireless network 100).

As shown in FIG. 8, and by reference number 810, the UE may identify an MPE event associated with one or more beams and/or determine that a PUSCH resource is unavailable. The PUSCH resource may be associated with at least one of the one or more beams that are associated with the MPE event.

As shown by reference number 820, the UE may determine that a PUCCH is available. In some aspects, the PUCCH resource may include an MPE dedicated PUCCH SR occasion (e.g., a dedicated SR-PUCCH). In some aspects, the PUCCH resource may be associated with a beam that is not associated with the MPE event and/or the PUSCH. For example, the transmit beam associated with the PUCCH resource may be determined by the UE, rather than configured by the base station.

As shown by reference number 830, the UE may receive a first uplink grant. In some aspects, the first uplink grant may be based at least in part on an SR transmitted by the UE before detecting the MPE event. The first uplink grant may be associated (e.g., by the UE) with a first uplink message that does not include a report for the MPE event. In some aspects, the first uplink grant may be associated with a beam that is associated with the MPE event.

As shown by reference number 840, the UE may transmit an SR via an MPE dedicated resource (e.g., an uplink resource dedicated for receiving requests for uplink grants to report an MPE event, a beam failure recovery event, and/or the like). In some aspects, the UE may transmit the SR via a beam that is different from the beam of the PUSCH resource.

In some aspects, the UE may have an available PUSCH resource (e.g., based at least in part on receiving the first uplink grant) and may determine to not transmit a report for the MPE event via the PUSCH resource. Instead, the UE may transmit a new SR or initiate a PRACH procedure (e.g., as described herein). In some aspects, the UE may determine to not transmit the report for the MPE event via the PUSCH resource based at least in part on the PUSCH resource being associated with a beam that is associated with the MPE event, availability of the MPE dedicated resource, and/or the like.

As shown by reference number 850, the UE may receive a second uplink grant based at least in part on the new SR. In some aspects, the UE may receive the second uplink grant from the base station to schedule one or more uplink resources to transmit a second uplink message that includes the report for the MPE event. In some aspects, the UE may receive the second uplink grant using a downlink resource that is associated with a beam that is associated with the MPE event. In some aspects, the UE may receive the second uplink grant using a downlink resource that is associated with a beam that is not associated with the MPE event.

As shown by reference number 860, the UE may transmit a first uplink message using an uplink resource (e.g., using an associated beam) associated with the first uplink grant. In some aspects, the UE may determine to transmit the first uplink message based at least in part on a determination that a beam associated with the uplink resource is not associated with the MPE event.

As shown by reference number 870, the UE may transmit a second uplink message. In some aspects, the UE may transmit the second uplink message using an uplink resource (e.g., and an associated beam) that is indicated in the second uplink grant. In some aspects, the UE may transmit the second uplink message using an uplink resource associated with a beam that the UE used to transmit the SR.

By skipping transmission of a report for an MPE event using an uplink resource associated with a beam that may be associated with the MPE event, and instead transmitting an SR via an MPE dedicated resource, the UE may conserve computing, communication, and/or network resources that may otherwise be used to attempt to transmit the report for the MPE event via the uplink resource and recover from the base station not receiving the report for the MPE event.

As indicated above, FIG. 8 is provided as an example. Other examples may differ from what is described with regard to FIG. 8.

Figure 9:
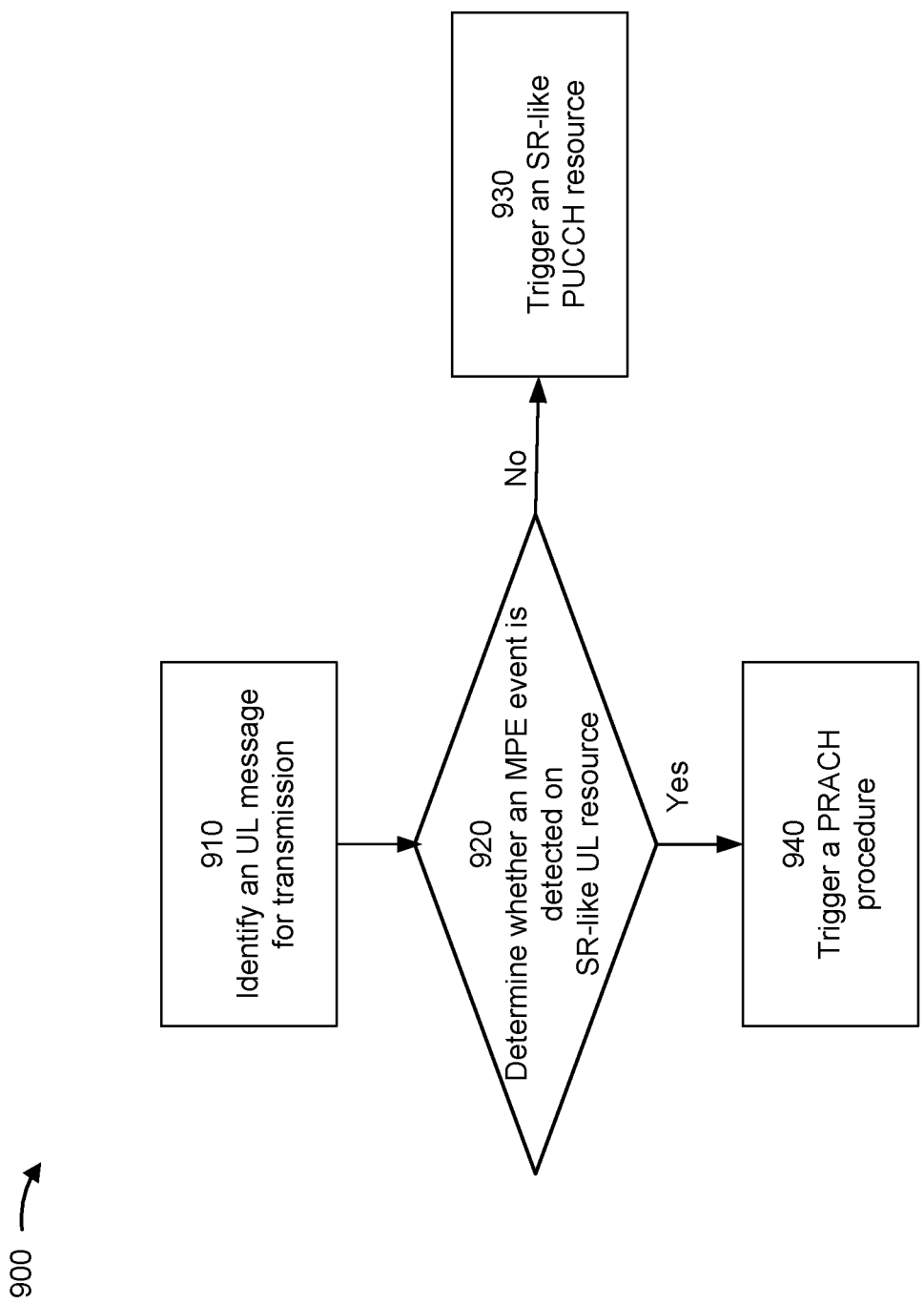
FIG. 9 is a diagram illustrating an example process performed, for example, by a UE, in accordance with various aspects of the present disclosure.

FIG. 9 is a diagram illustrating an example process 900 performed, for example, by a user equipment, in accordance with various aspects of the present disclosure.

As shown by reference number 910, the UE may identify an uplink message for transmission. For example, the uplink message may include a MAC-CE report for an MPE event, a beam failure recovery event, and/or the like.

As shown by reference number 920, the UE may determine whether an MPE event is detected on an SR-like uplink resource. For example, the UE may detect an MPE event and determine whether the SR-like uplink resource is associated with a beam that is associated with the MPE event.

As shown by reference number 930, based at least in part on determining that the MPE event is not detected on the SR-like uplink resource (e.g., an uplink resource that may be used to request an uplink grant), the UE may trigger an SR-like PUCCH resource.

As shown by reference number 940, based at least in part on determining that the MPE event is detected on the SR-like uplink resource, the UE may trigger a PRACH procedure (e.g., as described herein).

As indicated above, FIG. 9 is provided as an example. Other examples may differ from what is described with regard to FIG. 9.

Figure 10:
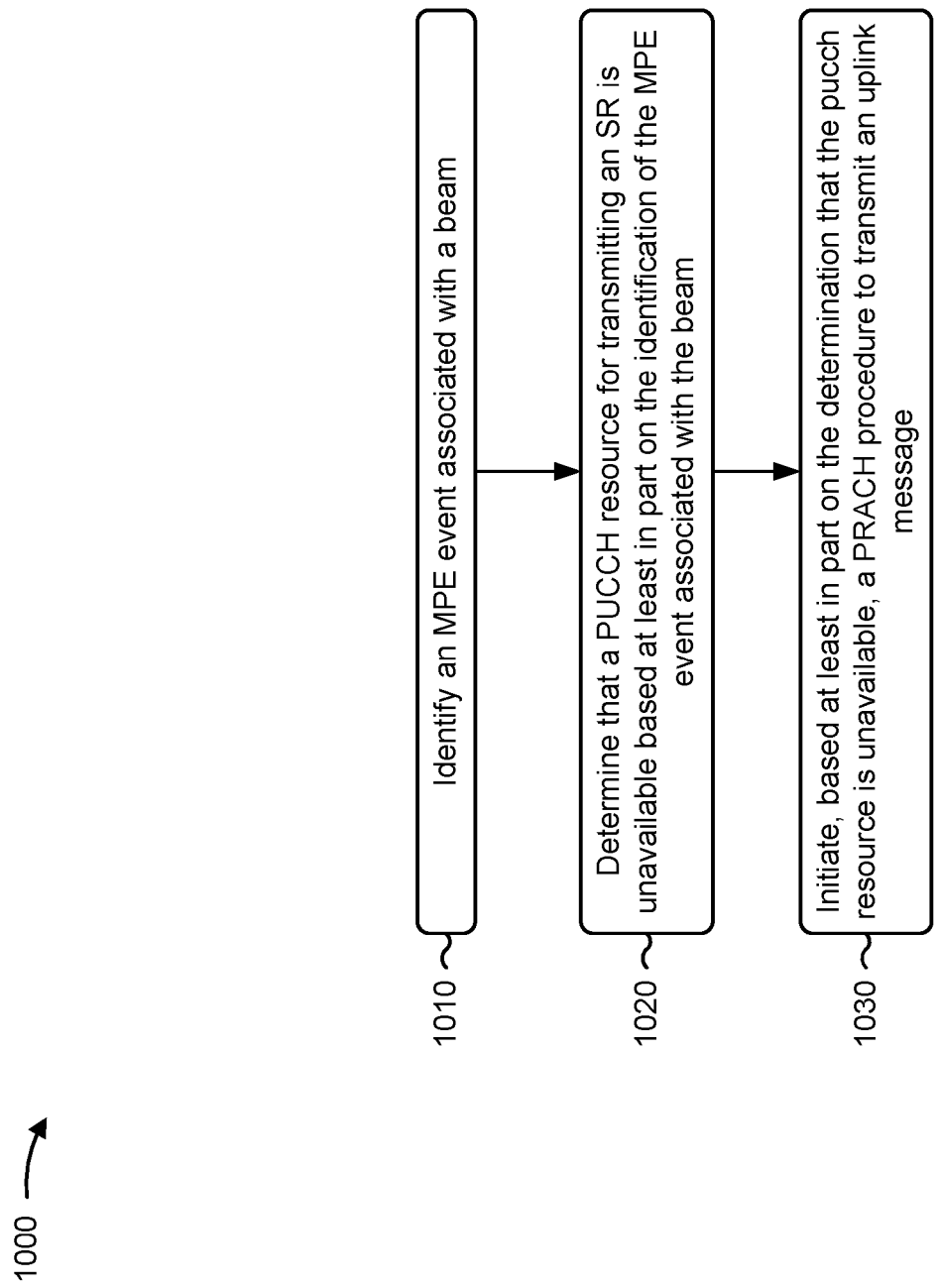
FIG. 10 is a diagram illustrating an example process performed, for example, by a UE, in accordance with various aspects of the present disclosure.

FIG. 10 is a diagram illustrating an example process 1000 performed, for example, by a UE, in accordance with various aspects of the present disclosure. Example process 1000 is an example where the UE (e.g., UE 120 and/or the like) performs operations associated with techniques for requesting uplink transmission resources for MPE reporting.

As shown in FIG. 10, in some aspects, process 1000 may include identifying an MPE event associated with a beam (block 1010). For example, the UE (e.g., using receive processor 258, transmit processor 264, controller/processor 280, memory 282, and/or the like) may identify an MPE event associated with a beam, as described above.

As further shown in FIG. 10, in some aspects, process 1000 may include determining that a PUCCH resource for transmitting a scheduling request is unavailable based at least in part on the identification of the MPE event associated with the beam (block 1020). For example, the UE (e.g., using receive processor 258, transmit processor 264, controller/processor 280, memory 282, and/or the like) may determine that a PUCCH resource for transmitting a scheduling request is unavailable based at least in part on the identification of the MPE event associated with the beam, as described above.

As further shown in FIG. 10, in some aspects, process 1000 may include initiating, based at least in part on the determination that the PUCCH resource is unavailable, a PRACH procedure to transmit an uplink message (block 1030). For example, the UE (e.g., using receive processor 258, transmit processor 264, controller/processor 280, memory 282, and/or the like) may initiate, based at least in part on the determination that the PUCCH resource is unavailable, a PRACH procedure to transmit an uplink message, as described above.

Process 1000 may include additional aspects, such as any single aspect or any combination of aspects described below and/or in connection with one or more other processes described elsewhere herein.

In a first aspect, the uplink message comprises one or more of a report of the MPE event, a beam failure report, or a physical uplink shared channel transmission.

In a second aspect, alone or in combination with the first aspect, the initiation of the PRACH procedure is based at least in part on a determination that an additional PUCCH resource for transmitting the scheduling request is unavailable.

In a third aspect, alone or in combination with one or more of the first and second aspects, process 1000 includes determining that the additional PUCCH resource for transmitting the scheduling request is unavailable based at least in part on the MPE event or an additional MPE event being associated with an additional beam associated with the additional PUCCH resource, and the initiation of the PRACH procedure is based at least in part on the determination that the additional PUCCH resource is unavailable.

In a fourth aspect, alone or in combination with one or more of the first through third aspects, the PRACH procedure comprises one of a contention based PRACH, a contention free PRACH, or a two-step PRACH.

In a fifth aspect, alone or in combination with one or more of the first through fourth aspects, process 1000 includes selecting a PRACH type from one or more candidate PRACH types, and the one or more candidate PRACH types include one or more of a contention based PRACH type, a contention free PRACH type, or a two-step PRACH type.

In a sixth aspect, alone or in combination with one or more of the first through fifth aspects, selection of the PRACH type includes selecting a contention free PRACH type if a contention free PRACH type is available, selecting a two-step PRACH type if a contention free PRACH type is unavailable and a two-step PRACH type is available, and selecting a contention based PRACH type if a contention free PRACH type is unavailable, a two-step PRACH type is unavailable, and a contention based PRACH type is available.

In a seventh aspect, alone or in combination with one or more of the first through sixth aspects, initiation of the PRACH procedure includes transmitting a Message 1 of a contention based PRACH procedure or a contention free-PRACH procedure.

In an eighth aspect, alone or in combination with one or more of the first through seventh aspects, process 1000 includes receiving an uplink grant to transmit the uplink message.

In a ninth aspect, alone or in combination with one or more of the first through eighth aspects, the uplink grant is an MPE dedicated uplink grant.

In a tenth aspect, alone or in combination with one or more of the first through ninth aspects, the reception of the uplink grant includes receiving the uplink grant via the beam of the PUCCH resource that is associated with the MPE event.

In an eleventh aspect, alone or in combination with one or more of the first through tenth aspects, the uplink grant indicates a new beam to use to transmit the uplink message.

In a twelfth aspect, alone or in combination with one or more of the first through eleventh aspects, process 1000 includes transmitting the uplink message.

In a thirteenth aspect, alone or in combination with one or more of the first through twelfth aspects, transmission of the uplink message includes transmitting the uplink message via a new beam.

In a fourteenth aspect, alone or in combination with one or more of the first through thirteenth aspects, the new beam is a same beam used to initiate the PRACH procedure or to transmit a scheduling request for the uplink message.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
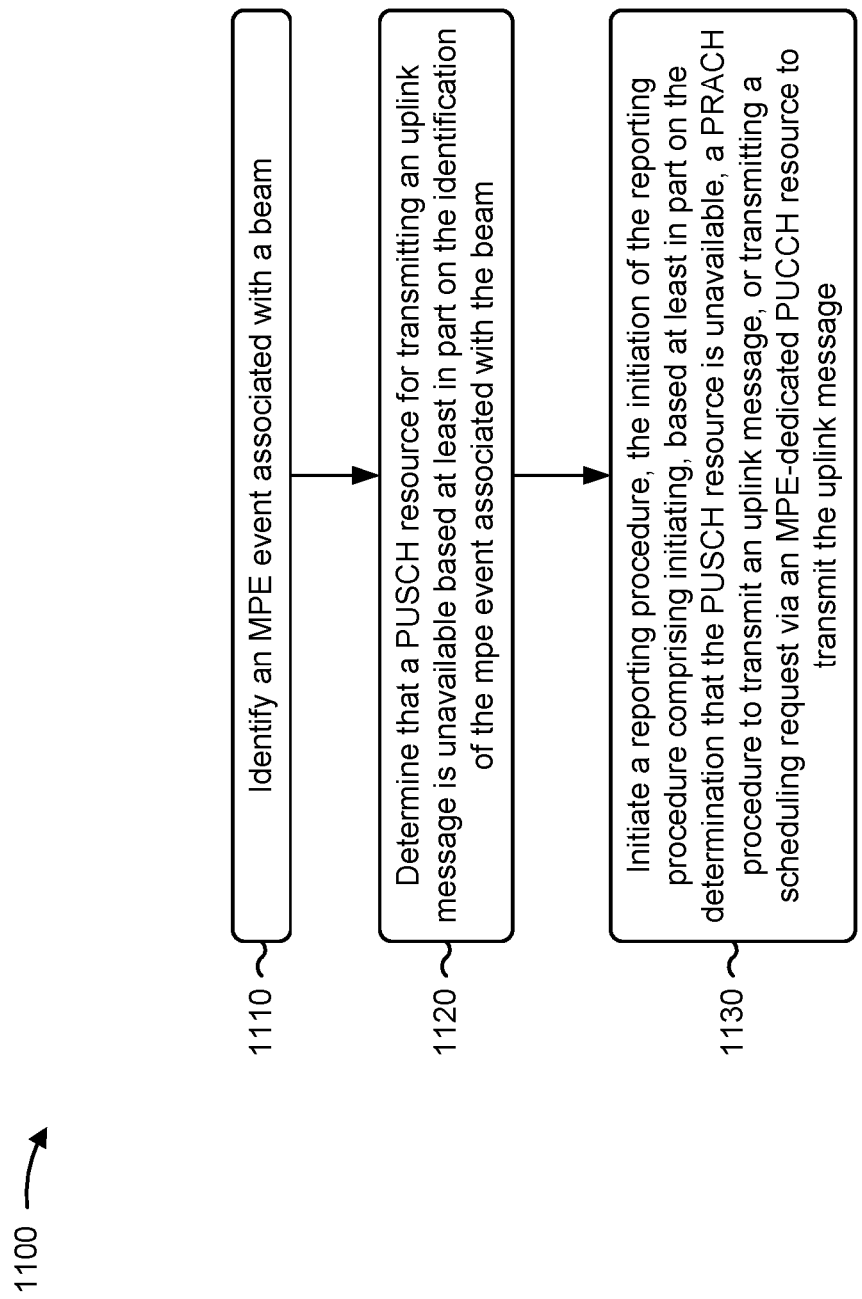
FIG. 11 is a diagram illustrating an example process performed, for example, by a UE, in accordance with various aspects of the present disclosure.

FIG. 11 is a diagram illustrating an example process 1100 performed, for example, by a UE, in accordance with various aspects of the present disclosure. Example process 1100 is an example where the UE (e.g., UE 120 and/or the like) performs operations associated with techniques for requesting uplink transmission resources for MPE reporting.

As shown in FIG. 11, in some aspects, process 1100 may include identifying an MPE event associated with a beam (block 1110). For example, the UE (e.g., using receive processor 258, transmit processor 264, controller/processor 280, memory 282, and/or the like) may identify an MPE event associated with a beam, as described above.

As further shown in FIG. 11, in some aspects, process 1100 may include determining that a PUSCH resource for transmitting an uplink message is unavailable based at least in part on the identification of the MPE event associated with the beam (block 1120). For example, the UE (e.g., using receive processor 258, transmit processor 264, controller/processor 280, memory 282, and/or the like) may determine that a PUSCH resource for transmitting an uplink message is unavailable based at least in part on the identification of the MPE event associated with the beam, as described above.

As further shown in FIG. 11, in some aspects, process 1100 may include initiating a reporting procedure, the initiation of the reporting procedure comprising initiating, based at least in part on the determination that the PUSCH resource is unavailable, a PRACH procedure to transmit an uplink message, or transmitting a scheduling request via an MPE-dedicated PUCCH resource to transmit the uplink message (block 1130). For example, the UE (e.g., using receive processor 258, transmit processor 264, controller/processor 280, memory 282, and/or the like) may initiate a reporting procedure, the initiation of the reporting procedure comprising initiating, based at least in part on the determination that the PUSCH resource is unavailable, a PRACH procedure to transmit an uplink message, or transmitting a scheduling request via an MPE-dedicated PUCCH resource to transmit the uplink message, as described above.

Process 1100 may include additional aspects, such as any single aspect or any combination of aspects described below and/or in connection with one or more other processes described elsewhere herein.

In a first aspect, process 1100 includes determining to not transmit a scheduling request via a PUCCH resource associated with the PUSCH resource based at least in part on the identification of the MPE event.

In a second aspect, alone or in combination with the first aspect, process 1100 includes determining to not transmit a scheduling request via a PUCCH resource associated with beam failure recovery based at least in part on the identification of the MPE event.

In a third aspect, alone or in combination with one or more of the first and second aspects, the uplink message includes one or more of a report of the MPE event, a beam failure report, or a PUSCH transmission.

In a fourth aspect, alone or in combination with one or more of the first through third aspects, process 1100 includes transmitting the uplink message.

In a fifth aspect, alone or in combination with one or more of the first through fourth aspects, transmission of the uplink message includes transmitting the uplink message via a new beam.

In a sixth aspect, alone or in combination with one or more of the first through fifth aspects, the new beam is a same beam used to initiate the PRACH procedure or to transmit a scheduling request for the uplink message.

In a seventh aspect, alone or in combination with one or more of the first through sixth aspects, the transmission of the scheduling request via the MPE-dedicated PUCCH resource includes transmitting a scheduling request via the MPE-dedicated PUCCH resource via an additional beam that is different from the beam of the PUSCH resource.

In an eighth aspect, alone or in combination with one or more of the first through seventh aspects, process 1100 includes receiving an uplink grant to transmit the uplink message.

In a ninth aspect, alone or in combination with one or more of the first through eighth aspects, the uplink grant is an MPE dedicated uplink grant.

In a tenth aspect, alone or in combination with one or more of the first through ninth aspects, the reception of the uplink grant includes receiving the uplink grant via the beam of the PUCCH resource that is associated with the MPE event.

In an eleventh aspect, alone or in combination with one or more of the first through tenth aspects, the uplink grant indicates a new beam to use to transmit the uplink message.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
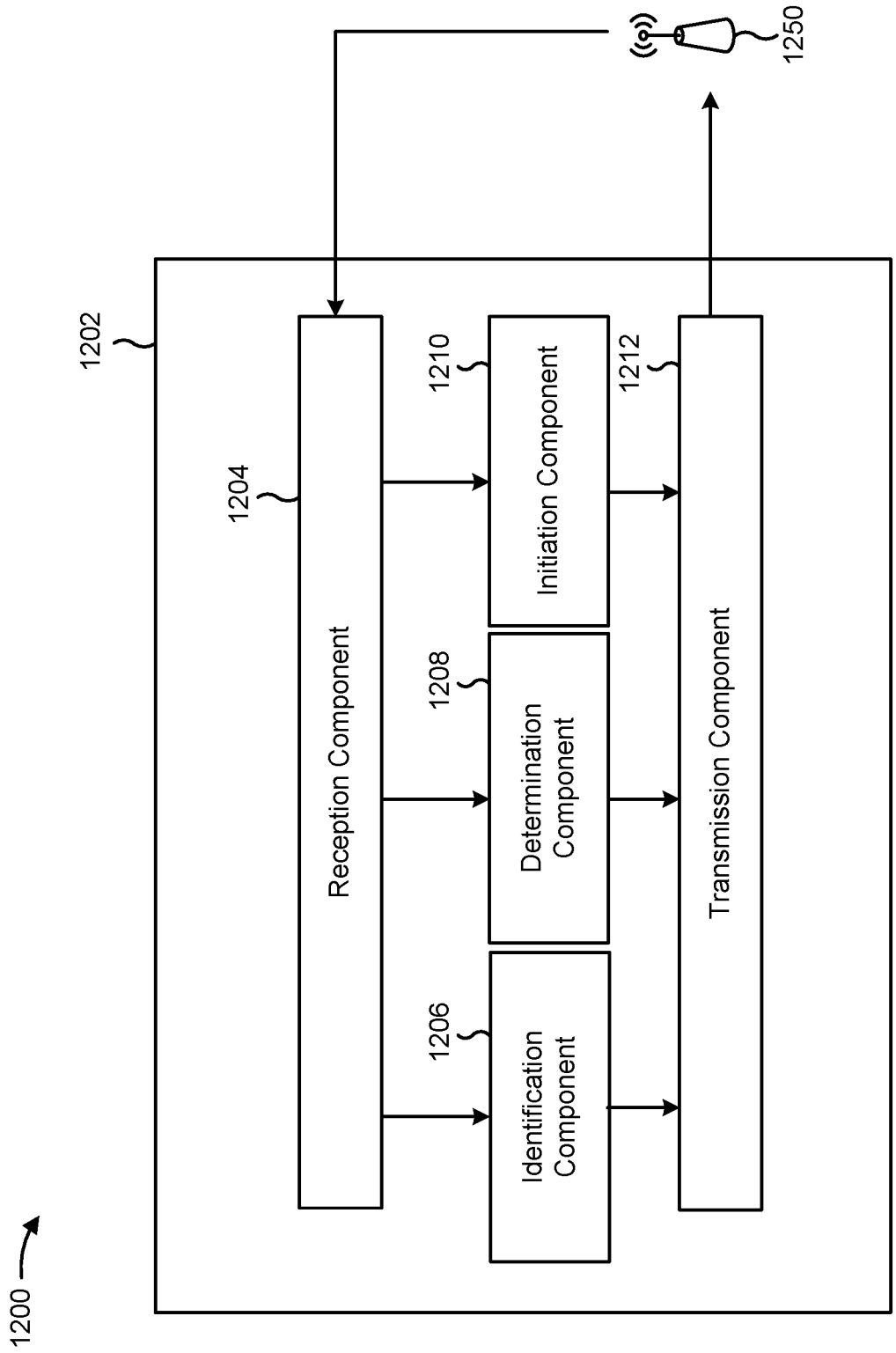
FIG. 12 is a conceptual data flow diagram illustrating a data flow between different components in an example apparatus, in accordance with various aspects of the present disclosure.

FIG. 12 is a conceptual data flow diagram 1200 illustrating a data flow between different components in an example apparatus 1202. The apparatus 1202 may be a UE (e.g., UE 120). In some aspects, the apparatus 1202 includes a reception component 1204, an identification component 1206, a determination component 1208, an initiation component 1210, and/or a transmission component 1212.

In some aspects, the apparatus may communicate with a base station via one or more beams using the reception component 1204 and the transmission component 1212. The UE may use the identification component 1206 to identify an MPE event associated with a beam. For example, the identification component 1206 may determine that an MPE-based uplink beam failure event has occurred. Determination component 1208 may determine whether a PUCCH resource for transmitting an SR is available. The initiation component 1210 may initiate a PRACH procedure to transmit an uplink message (e.g., a MAC-CE report for the MPE event).

The apparatus may include additional components that perform each of the blocks of the algorithm in the aforementioned process 900 of FIG. 9, process 1000 of FIG. 10, process 1100 of FIG. 11, and/or the like. Each block in the aforementioned process 900 of FIG. 9, process 1000 of FIG. 10, process 1100 of FIG. 11, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of components (e.g., one or more components) shown in FIG. 12 may perform one or more functions described as being performed by another set of components shown in FIG. 12.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    identifying a maximum permissible exposure (MPE) event associated with a beam;
    determining that a physical uplink control channel (PUCCH) resource for transmitting a scheduling request is unavailable based at least in part on the identification of the MPE event associated with the beam; and
    initiating, based at least in part on the determination that the PUCCH resource and an additional PUCCH resource for transmitting the scheduling request are unavailable, a physical random access channel (PRACH) procedure to transmit an uplink message.

2. The method of claim 1, wherein the uplink message comprises one or more of:
    a report of the MPE event,
    a beam failure report, or
    a physical uplink shared channel transmission.

3. The method of claim 1, further comprising:
    determining that the additional PUCCH resource for transmitting the scheduling request is unavailable based at least in part on the MPE event or an additional MPE event being associated with an additional beam associated with the additional PUCCH resource,
        wherein the initiation of the PRACH procedure is based at least in part on the determination that the additional PUCCH resource is unavailable.

4. The method of claim 1, wherein the PRACH procedure comprises one of:
    a contention based PRACH,
    a contention free PRACH, or
    a two-step PRACH.

5. The method of claim 1, further comprising:
    selecting a PRACH type from one or more candidate PRACH types,
        wherein the one or more candidate PRACH types comprise one or more of:
            a contention based PRACH type,
            a contention free PRACH type, or
            a two-step PRACH type.

6. The method of claim 5, wherein selection of the PRACH type comprises:
    selecting a contention free PRACH type if a contention free PRACH type is available;
    selecting a two-step PRACH type if a contention free PRACH type is unavailable and a two-step PRACH type is available; and
    selecting a contention based PRACH type if a contention free PRACH type is unavailable, a two-step PRACH type is unavailable, and a contention based PRACH type is available.

7. The method of claim 1, wherein initiation of the PRACH procedure comprises transmitting a Message 1 of a contention based PRACH procedure or a contention free-PRACH procedure.

8. The method of claim 1, further comprising:
receiving an uplink grant to transmit the uplink message.

9. The method of claim 8, wherein the uplink grant is an MPE dedicated uplink grant.

10. The method of claim 8, wherein the reception of the uplink grant comprises:
receiving the uplink grant via the beam of the PUCCH resource that is associated with the MPE event.

11. The method of claim 8, wherein the uplink grant indicates a new beam to use to transmit the uplink message.

12. The method of claim 1, further comprising:
transmitting the uplink message.

13. The method of claim 12, wherein transmission of the uplink message comprises:
transmitting the uplink message via a new beam.

14. The method of claim 13, wherein the new beam is a same beam used to initiate the PRACH procedure or to transmit a scheduling request for the uplink message.

15. A method of wireless communication performed by a user equipment (UE), comprising:
identifying a maximum permissible exposure (MPE) event associated with a beam;
determining that a physical uplink shared channel (PUSCH) resource for transmitting an uplink message is unavailable based at least in part on the identification of the MPE event associated with the beam; and
initiating a reporting procedure, the initiation of the reporting procedure comprising:
initiating, based at least in part on the determination that the PUSCH resource and an additional PUCCH resource for transmitting the scheduling request are unavailable, a physical random access channel (PRACH) procedure to transmit an uplink message, or
transmitting a scheduling request via an MPE-dedicated physical uplink control channel (PUCCH) resource to transmit the uplink message.

16. The method of claim 15, further comprising:
determining to not transmit a scheduling request via a PUCCH resource associated with the PUSCH resource based at least in part on the identification of the MPE event.

17. The method of claim 15, further comprising:
determining to not transmit a scheduling request via a PUCCH resource associated with beam failure recovery based at least in part on the identification of the MPE event.

18. The method of claim 15, wherein the uplink message comprises one or more of:
a report of the MPE event,
a beam failure report, or
a physical uplink shared channel transmission.

19. The method of claim 15, further comprising:
transmitting the uplink message.

20. The method of claim 19, wherein transmission of the uplink message comprises:
transmitting the uplink message via a new beam.

21. The method of claim 20, wherein the new beam is a same beam used to initiate the PRACH procedure or to transmit a scheduling request for the uplink message.

22. The method of claim 15, wherein the transmission of the scheduling request via the MPE-dedicated PUCCH resource comprises:
transmitting a scheduling request via the MPE-dedicated PUCCH resource via an additional beam that is different from the beam of the PUSCH resource.

23. The method of claim 15, further comprising:
receiving an uplink grant to transmit the uplink message.

24. The method of claim 23, wherein the uplink grant is an MPE dedicated uplink grant.

25. The method of claim 23, wherein the reception of the uplink grant comprises:
receiving the uplink grant via the beam of the PUCCH resource that is associated with the MPE event.

26. The method of claim 23, wherein the uplink grant indicates a new beam to use to transmit the uplink message.

27. A user equipment (UE) for wireless communication, comprising:
a memory; and
one or more processors coupled to the memory, the memory and the one or more processors configured to:
identify a maximum permissible exposure (MPE) event associated with a beam;
determine that a physical uplink control channel (PUCCH) resource for transmitting a scheduling request is unavailable based at least in part on the identification of the MPE event associated with the beam; and
initiate, based at least in part on the determination that the PUCCH resource and an additional PUCCH resource for transmitting the scheduling request are unavailable, a physical random access channel (PRACH) procedure to transmit an uplink message.

28. The UE of claim 27, wherein the uplink message comprises one or more of:
a report of the MPE event,
a beam failure report, or
a physical uplink shared channel transmission.

29. The UE of claim 27, wherein the one or more processors are further configured to:
select a PRACH type from one or more candidate PRACH types,
wherein the one or more candidate PRACH types comprise one or more of:
a contention based PRACH type,
a contention free PRACH type, or
a two-step PRACH type.

30. A user equipment (UE) for wireless communication, comprising:
a memory; and
one or more processors coupled to the memory, the memory and the one or more processors configured to:
identify a maximum permissible exposure (MPE) event associated with a beam;
determine that a physical uplink shared channel (PUSCH) resource for transmitting an uplink message is unavailable based at least in part on the identification of the MPE event associated with the beam; and
initiate a reporting procedure, the initiation of the reporting procedure comprising:
initiate, based at least in part on the determination that the PUSCH resource and an additional PUCCH resource for transmitting the scheduling request are unavailable, a physical random access channel (PRACH) procedure to transmit an uplink message, or
transmit a scheduling request via an MPE-dedicated physical uplink control channel (PUCCH) resource to transmit the uplink message.

31. The UE of claim 30, wherein the uplink message comprises one or more of:
    a report of the MPE event,
    a beam failure report, or
    a physical uplink shared channel transmission.

32. The UE of claim 30, wherein the transmission of the scheduling request via the MPE-dedicated PUCCH resource comprises:
    transmitting a scheduling request via the MPE-dedicated PUCCH resource via an additional beam that is different from the beam of the PUSCH resource.

* * * * *